United States Patent
Kobayashi

Patent Number: 6,094,223
Date of Patent: Jul. 25, 2000

[54] AUTOMATIC FOCUS SENSING DEVICE

[75] Inventor: Kazuya Kobayashi, Sagamihara, Japan

[73] Assignee: Olympus Optical Co., Ltd., Tokyo

[21] Appl. No.: 08/784,338

[22] Filed: Jan. 16, 1997

[30] Foreign Application Priority Data

Jan. 17, 1996 [JP] Japan ................................ 8-005757

[51] Int. Cl.[7] ........................................... G03B 13/00
[52] U.S. Cl. .................... 348/354; 348/345; 348/349
[58] Field of Search .................... 348/345, 349, 348/353, 354, 356, 357, 296, 229; 250/201.2, 201.3, 201.7, 201.8

[56] References Cited

U.S. PATENT DOCUMENTS

| | | | |
|---|---|---|---|
| 4,853,788 | 8/1989 | Murashima et al. | 348/356 |
| 5,157,502 | 10/1992 | Nakajima et al. | 348/296 |
| 5,233,428 | 8/1993 | Alford et al. | 348/296 |
| 5,249,058 | 9/1993 | Murata et al. | 348/356 |
| 5,361,095 | 11/1994 | Toshinobu et al. | 348/354 |
| 5,376,964 | 12/1994 | Soga et al. | 348/229 |
| 5,387,960 | 2/1995 | Hirasawa et al. | 348/345 |
| 5,432,332 | 7/1995 | Kaneko | 348/354 |
| 5,534,923 | 7/1996 | Suda | 348/354 |
| 5,614,951 | 3/1997 | Lee et al. | 348/356 |

FOREIGN PATENT DOCUMENTS

| | | |
|---|---|---|
| 5-236326 | 9/1993 | Japan . |
| 6-118297 | 4/1994 | Japan . |
| 6-233171 | 8/1994 | Japan . |

OTHER PUBLICATIONS

NHK Technical Journal 86 Vo. 17, No. 1, 1965, p. 25.

*Primary Examiner*—Wendy Garber
*Assistant Examiner*—Luong Nguyen
*Attorney, Agent, or Firm*—Louis Weinstein

[57] ABSTRACT

An automatic focus sensing device senses an in-focus position by using a high-frequency component in an image signal to step drive an imaging lens in the direction of the optical axis of the imaging lens while the image signal is being read in succession to the photoelectrical conversion and then integration of the light of an object incident on an image pickup device. The device generates, in non-synchronization with and independently of an image synchronization signal, a driving pulse fed to an imaging lens driving device for driving the imaging lens.

18 Claims, 9 Drawing Sheets

AUTOMATIC FOCUS SENSING DEVICE

BACKGROUND OF THE INVENTION

1. Field of the Invention

The present invention relates to an automatic focus sensing device that automatically senses an in-focus point by driving an imaging lens.

2. Related Art Statement

In one of known autofocusing methods employed in image pickup apparatuses having an image pickup device, the contrast information of an object indicative of the degree of focus, such as a contrast value, is obtained based on an image signal that is acquired when a focusing lens or an imaging lens is projected or recessed. The position that offers the maximum value, namely, the maximum-contrast position, is regarded as the in-focus position, and the focusing lens is driven to that position. This autofocusing method is called the "mountain climbing" method, detailed in "NHK TECHNICAL JOURNAL" (86, Vol. 17, No. 1, 1965), page 25.

Japanese Unexamined Patent Publication No. 5-236326 discloses, as a fast driving method for driving a focusing lens in the above image pickup apparatus, a focusing method for driving a focusing lens in non-synchronization with a synchronization signal for generating a video signal. In this method, the driving of the focusing lens is suspended for a duration during which contrast information indicative of the degree of focus within an in-focus area is generated, and at the moment the contrast value is obtained, the amount of driving for the focusing lens is determined and the focusing lens is driven. In this way, the focusing lens is driven without waiting for the synchronization signal, thereby ensuring a fast focus control.

In another known method, focusing speed is increased by picking up contrast values at three positions of a focusing lens, and this method is disclosed in Japanese Unexamined Patent Publication 6-118297. According to this disclosure, contrast values are picked up at three positions with priority, namely at the center position within the position adjustment range of an imaging system and two other positions on both sides of the center position. If the center position presents a maximum contrast, this position is determined to be an in-focus position. If that position is not determined so, a determination is further made of whether either of both side positions presents a higher contrast value. While the point of measurement of contrast value is shifted to the higher contrast position side, a determination is made of whether the higher contrast position is in-focus depending on whether it gives a maximum contrast.

Conventionally available is a method that employs a plurality of AF (autofocus) areas for autofocus sensing to monitor concurrently contrast values within the respective AF areas and to switch to an optimum AF area. Such a method is disclosed in Japanese Unexamined Patent Publication 6-233171, for example. According to this method, the focusing operation is possible even if one AF area fails to provide its contrast value, as long as other AF areas successfully provide their contrast values.

In the known focusing method for driving a focusing lens in non-synchronization with a synchronization signal for generating a video signal, the focusing lens is suspended while the contrast information indicative of the degree of focus within the in-focus area is produced. In such a method, as the in-focus area expands, the time required to produce the contrast information is accordingly prolonged. For this reason, the time allowed to drive the focusing lens is shortened, and the focusing time until the completion of a focusing operation is thereby delayed.

Furthermore, in the known method where the focusing speed is increased by picking up contrast values at three positions of the focusing lens, the center position is determined to be an in-focus position if it presents a maximum contrast. This expedites the focusing operation. If that position is not determined so, a determination is further made of whether either of both remaining positions presents a higher contrast value. While the point of measurement of contrast value is shifted to the higher contrast position side, a determination is made of whether the higher contrast position is in-focus depending on whether it gives a maximum contrast. If the in-focus position fails to agree with the center position within the position adjustment range, this method simply performs the known "mountainclimbing" method sequentially and no substantial speedup of focusing operation is expected.

In the method that employs a plurality of AF areas for autofocus sensing to monitor concurrently contrast values within the respective AF areas and to switch to an optimum AF area, the following problem arises in a focusing operation. To achieve a faster focusing speed, the lens is driven even while an image pickup device accumulates and integrates the light from an object. Particularly when the AF areas are arranged vertically, resulting contrast values fail to agree in the in-focus position, and a proper focusing operation cannot be carried out.

OBJECTS AND SUMMARY OF THE INVENTION

It is a first object of the present invention to provide an automatic focus sensing device that quickly senses an in-focus position.

It is a second object of the present invention to provide an automatic focus sensing device that generates, in non-synchronization with and independently of an image synchronization signal, a driving pulse fed to an imaging lens driving device for driving an imaging lens, thereby driving the imaging lens fast and sensing an in-focus position fast.

It is a third object of the present invention to provide an automatic focus sensing device that performs reliably an AF operation from first sampled data.

It is a fourth object of the present invention to provide an automatic focus sensing device which picks up a signal for automatic focus sensing during the driving of the imaging lens, and which is capable of autofocusing with the imaging lens driven in non-synchronization with an image synchronization signal.

It is a fifth object of the present invention to provide an automatic focus sensing device which picks up a signal for automatic focus sensing during the driving of the imaging lens, and which permits a high focus sensing accuracy during non-synchronous autofocusing.

It is a sixth object of the present invention to provide an automatic focus sensing device which picks up a signal for automatic focus sensing during the driving of the imaging lens even if the integration time of an image pickup device is modified, without autofocusing accuracy degradation.

It is a seventh object of the present invention to provide an automatic focus sensing device which offers a high autofocusing accuracy regardless of the position of an autofocusing area used for autofocusing.

It is an eighth object of the present invention to provide an automatic focus sensing device which is free from autofocusing accuracy degradation in each autofocusing area even if a plurality of autofocusing areas are set up.

It is a ninth object of the present invention to provide an automatic focus sensing device which is free from autofocusing accuracy degradation in each autofocusing area even if a plurality of autofocusing areas are set up in the vertical direction of the photoelectric conversion area of the image pickup device.

It is a tenth object of the present invention to provide an automatic focus sensing device which selectively or switchably uses the autofocusing areas used for autofocusing, depending on an operating environment and conditions.

It is an eleventh object of the present invention to provide an automatic focus sensing device which independently picks up contrast values at a plurality of autofocusing areas and lens positions.

It is an twelfth object of the present invention to provide an automatic focus sensing device which picks up contrast values corresponding to the number of lens positions equal to (the number of autofocusing areas) x (the number of samplings), even if the number of samplings is small.

It is a thirteen object of the present invention to provide an automatic focus sensing device which resolves the effect of the flickering of a light source on autofocusing.

It is a fourteenth object of the present invention to provide an automatic focus sensing device which permits a simple prediction computation and senses a true in-focus position fast.

It is a fifteenth object of the present invention to provide an automatic focus sensing device which is capable of performing an autofocusing operation based on only three samplings.

It is a sixteenth object of the present invention to provide an automatic focus sensing device which reliably senses an in-focus position by preventing the out-of-step motion of a stepping motor for autofocusing driving.

It is a seventeenth object of the present invention to provide an automatic focus sensing device which easily determines a midpoint of an integration time of the image pickup device permitting a high accuracy focus sensing.

It is an eighteenth object of the present invention to provide an automatic focus sensing device which maintains focusing accuracy even with coarse sampling points.

An automatic focus sensing device of the present invention senses an in-focus position by using a high-frequency component in an image signal to step drive an imaging lens in the direction of the optical axis of the imaging lens, said image signal being read in succession to the photoelectrical conversion and then integration of the light of an object incident on an image pickup device, whereby said device generates, in non-synchronization with and independently of an image synchronization signal, a driving pulse fed to an imaging lens driving device for driving the imaging lens.

These as well as other objects and advantages of the present invention will become further apparent from the following detailed explanation.

DETAILED DESCRIPTION OF THE PREFERRED EMBODIMENTS

Figure 1:
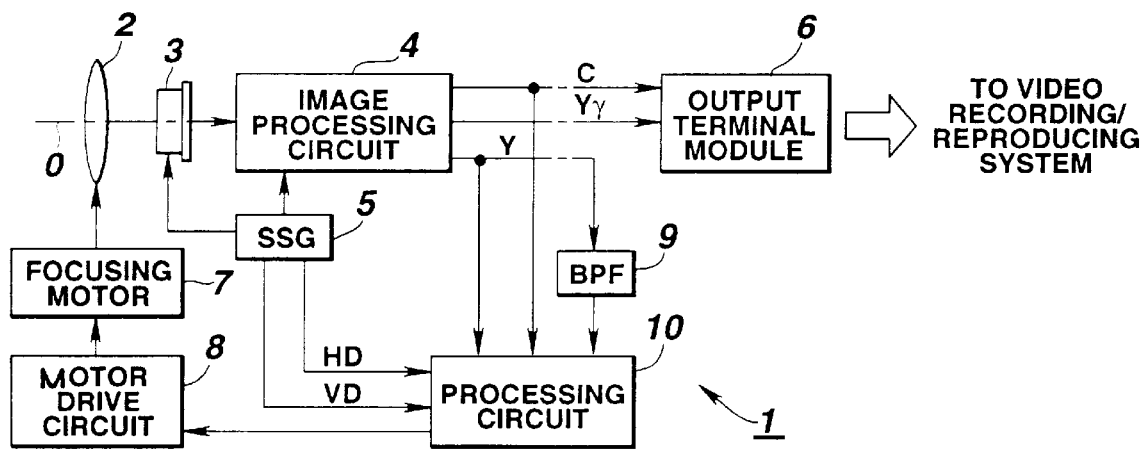
FIG. 1 is a block diagram showing an electronic image pickup apparatus in which one embodiment of the present invention is implemented.

The embodiments of the present invention are now discussed. FIG. 1 is the block diagram showing the electronic image pickup apparatus in which the automatic focus sensing device of one embodiment of the present invention is implemented.

As shown, the image pickup apparatus 1 comprises:

an imaging lens 2 for forming an optical image of an object to image the object;

an image pickup device 3 arranged in a manner that the receiving surface (or imaging surface) of the image pickup device 3 is perpendicular to the optical axis O of the imaging lens 2 at a predetermined position on the optical axis O, for converting the optical image of the object formed on the receiving surface into an electrical signal;

an image processing circuit (also referred to as video signal processing circuit) 4 for performing, on the signal of image pickup device 3, image signal amplification, sample and hold action, A/D conversion, γ correction, and luminance/color conversion and for producing a luminance signal Y and the like;

a pulse signal generator circuit (hereinafter referred to as SSG circuit) 5 for producing a driving signal required to drive the image pickup device 3, and reference signals (various pulses such as horizontal, vertical synchronization signals) required to perform video signal processing;

an output terminal module 6 for outputting a video signal to an unshown video recording/reproducing system;

a driving motor (also referred to as focusing motor) 7 for moving the imaging lens 2 along the optical axis O to drive the imaging lens 2 to an in-focus position of the image pickup device 3;

a motor drive circuit 8 for supplying a driving signal to the focusing motor 7 to drive the focusing motor 7;

a band-pass filter (BPF) circuit 9 for extracting a high-frequency component from the luminance signal Y to obtain a contrast value for assessing the degree of focus; and a processing circuit 10 constructed of a CPU, a ROM, a RAM, a timer and the like, for controlling the motor drive circuit 8 to set the imaging lens 2 to an in-focus position where a maximum contrast value is obtained.

In the image pickup apparatus 1, the light of the object that is picked up through the imaging lens 2 forms the image of the object on the receiving surface of the image pickup device 3. An unshown color filter such as a mosaic filter is placed in front of the receiving surface of the image pickup device 3. The light from the object is optically color separated on a pixel by pixel basis, and is then photoelectrically converted by the image pickup device 3. The output signal, namely the image signal, of the image pickup device 3 is fed to the image processing circuit 4, where the image signal is subjected to amplification, sample and hold action, A/D conversion, luminance/color conversion and the like, and the signals thus processed are output to the output terminal module 6, BPF circuit 9 and processing circuit 10.

A γ-corrected luminance signal Yγ and a color signal C are fed to the output terminal module 6. The output terminal module 6 outputs its output signal to the circuit in the video recording/reproducing system. The luminance signal Y that has not been γ corrected is fed to the BPF circuit 9 and processing circuit 10.

The BPF circuit 9 extracts the quantity of high-frequency component (hereinafter referred to as contrast value) from the input luminance signal Y and outputs it to the processing circuit 10. The processing circuit 10 performs a photometering (AE) process by integrating the luminance signal Y output from the image processing circuit 4, and also performs a white balance (WB) process based on the color signal C. The processing circuit 10 also performs an auto-focusing (AF) process by integrating the output signal, namely the contrast value, of the BPF circuit 9 over a predetermined AF area.

The processing circuit 10 receives a vertical synchronization signal VD and a horizontal synchronization signal HD from the SSG circuit 5. Based on these signals, the processing circuit 10 determines the timing the AF area subjected to AF processing in the image pickup device 3 is picked up or the contrast value of the AF area is picked up.

In this case, a plurality of AF areas may be set or selected (varied) based on the vertical synchronization signal VD and the horizontal synchronization signal HD. Similarly, a plurality of AE/WB areas may be set or varied. The integration of the contrast value to be used for AF processing is called an AF assessment value.

According to this embodiment, the vertical synchronization signal VD and horizontal synchronization signal HD are fed to interrupt terminals of the processing circuit 10 to be used in AF, AE, WB processes and the like. The processing circuit 10 controls focus determining means and the imaging lens 2, and further step drives the focusing motor 7 through the motor drive circuit 8 during AF operation, while performing an in-focus position sensing process. The processing circuit 10 houses control means for moving the imaging lens 2 to a predetermined position and means (hereinafter referred to as a device shutter) for varying the integration time of the image pickup device 3 through AE.

As described above, according to this embodiment, the imaging lens 2 is step driven along the optical axis O during AF operation (by applying a driving pulse to the motor 7 that constitutes an imaging lens driving device), and the contrast value is produced from the image signal obtained during the driving of the imaging lens 2. The lens position corresponding to the contrast value is set to be the center of the drive quantity (specifically the number of steps) which have been used to drive the imaging lens 2 during the integration time of the image pickup device 3 (when the imaging lens 2 is driven at a uniform speed); thus, the suspension of the lens driving operation until the production of the contrast value is not required, and the in-focus position sensing is completed in a short duration of time.

Figure 2:
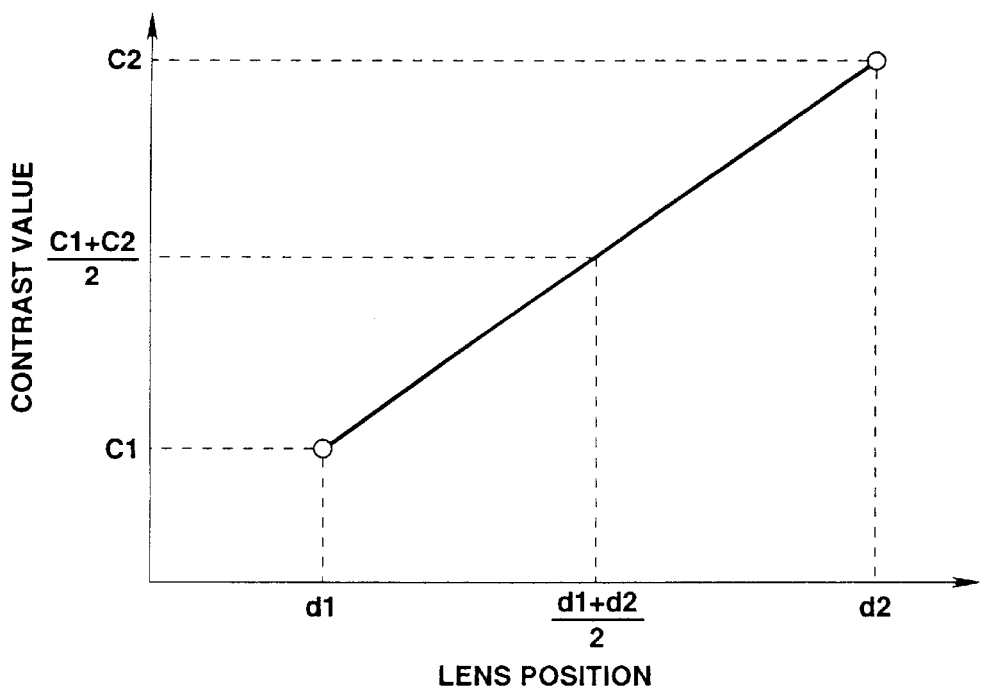
FIG. 2 plots contrast values that are obtained when an imaging lens is set at two lens positions against an object remaining still relative to the automatic focus sensing device.

FIG. 2 shows the resulting contrast values that are obtained with the imaging lens 2 set at two imaging lens positions (referred to simply as lens position) d1 and d2 spaced apart along the optical axis by a predetermined distance therebetween and with the object fixed (still) relative to the automatic focus sensing device under a constant light condition. As understood from the results in FIG. 2, a contrast value C1 is obtained at the lens position d1 and a contrast value C2 is obtained at the lens position d2 (when a shutter speed is set to $\frac{1}{60}$ s and 1 VD period corresponding to one field video period is $\frac{1}{60}$ s).

When the imaging lens 2 is moved at a uniform speed between two lens positions d1 and d2 under these conditions (for example, moved between two lens positions d1 and d2 in $\frac{1}{60}$ s), a contrast value of approximately (C1+C2)/2 is obtained, and the lens position corresponding to the contrast value is approximately (d1+d2)/2 as can be verified through a test.

Making use of the relationship between the contrast value and lens position in the driving of the imaging lens 2, the approximate midpoint of the step count or the number of steps that are driven during the integration time of the image pickup device 3 is determined to be the number of steps for use in focus processing when AF processing is performed in this embodiment.

In other words, by using the relationship between the contrast value and lens position, the contrast value of AF processing and the lens position corresponding to the contrast value are obtained even during the driving of the imaging lens 2. This arrangement makes it unnecessary for the imaging lens to stop until the acquisition of a contrast value for AF processing, thereby permitting sensing of an in-focus position fast and in a short duration of time.

Specifically, the imaging lens 2 is driven, and based on the output value (namely, the contrast value) of the high-frequency component of the image signal integrated and output by the image pickup device 3, the midpoint or the like of the travel of the imaging lens 2 driven (moved) during the integration time is regarded as the lens position corresponding to the contrast value.

Figure 3:
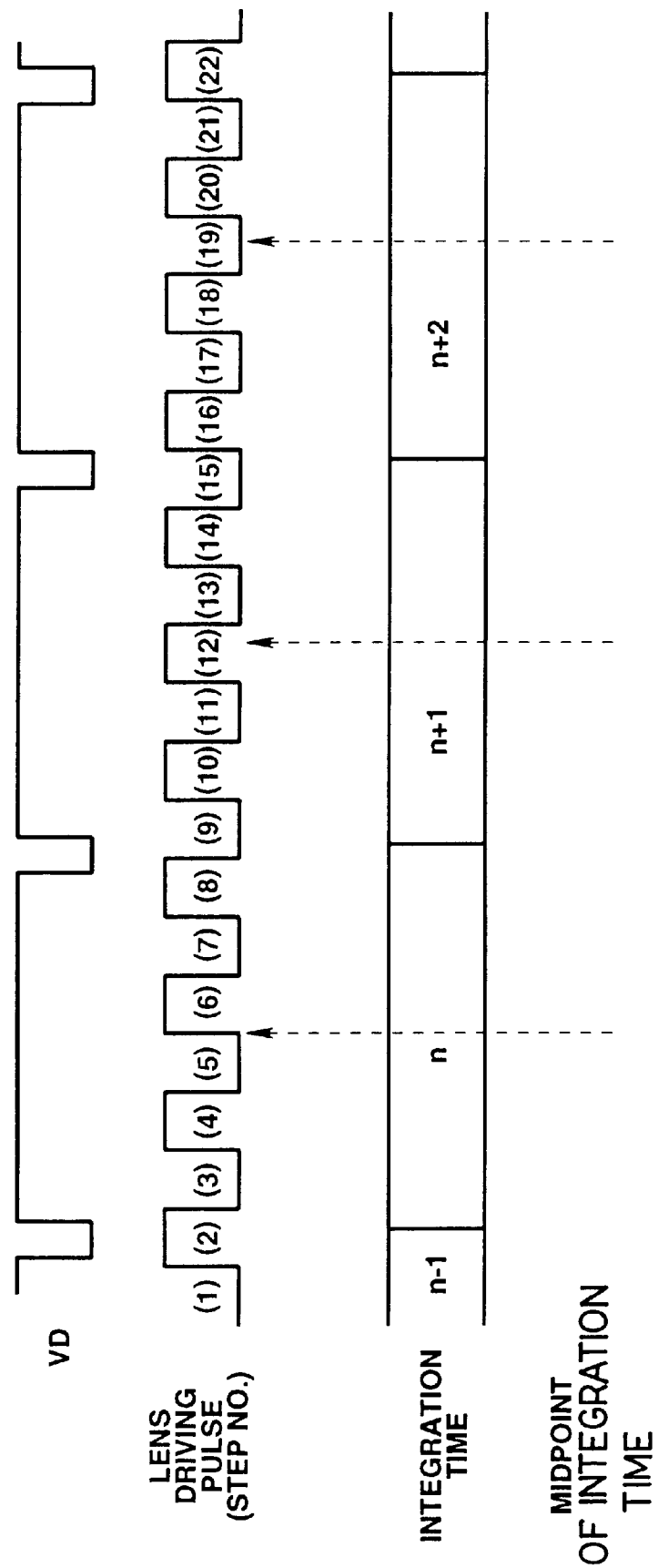
FIG. 3 shows NTSC video signals in which the step position at the midpoint of an integration time is used for focusing when an imaging lens is step driven.

Referring to FIG. 3, the NTSC image signals, as an example, are discussed.

FIG. 3 shows, from top, the vertical synchronization signal VD, a lens driving pulse (step number), integration times for fields n, n+1, and n+2, and the midpoint of each integration time. FIG. 3 illustrates the case where the imaging area or photoelectrical conversion area of the image pickup device 3 is entirely used for focus sensing.

For simplicity, the image synchronization signal is set to agree with the synchronization signal of a video signal. Specifically, the image pickup device driving signal for reading an image signal integrated in the image pickup device 3 is applied to the image pickup device 3 in synchronization with the vertical synchronization signal VD of the video signal. The image signal of each field is thus output and the video signal is derived from the image signal.

When an exposure time or integration time is set to be 1/60 s as shown in FIG. 3, the contrast value derived from an n-th field video signal is used for focus sensing as being obtained at the fifth or sixth pulse (at corresponding lens positions).

Similarly, the contrast value derived from an (n+1)-th field video signal is used as being obtained at the twelfth pulse, and the contrast value derived from an (n+2)-th field video signal is used as being obtained at the nineteenth pulse. By using the number of steps at the approximately middle pulse of the pulses (steps) that are driven during the integration time of the image pickup device 3, AF operation is possible without the need for driving the imaging lens 2, in synchronization with the synchronization signal (VD in this case) for generating the video signal or in synchronization with the image synchronization signal.

In the embodiment shown in FIG. 3, the lens driving pulse fed to the motor 7 for driving the imaging lens 2 is non-synchronous with the synchronization signal for imaging, and is produced independently of the synchronization signal. Therefore, an idle time for ensuring synchronization with the synchronization signal is not required, and the lens is driven fast (or more time is allowed for lens driving). This embodiment, however, needs means for detecting the lens driving pulse position corresponding to the midpoint of the integration time or for detecting the lens position corresponding to the lens driving pulse position.

Figure 4:
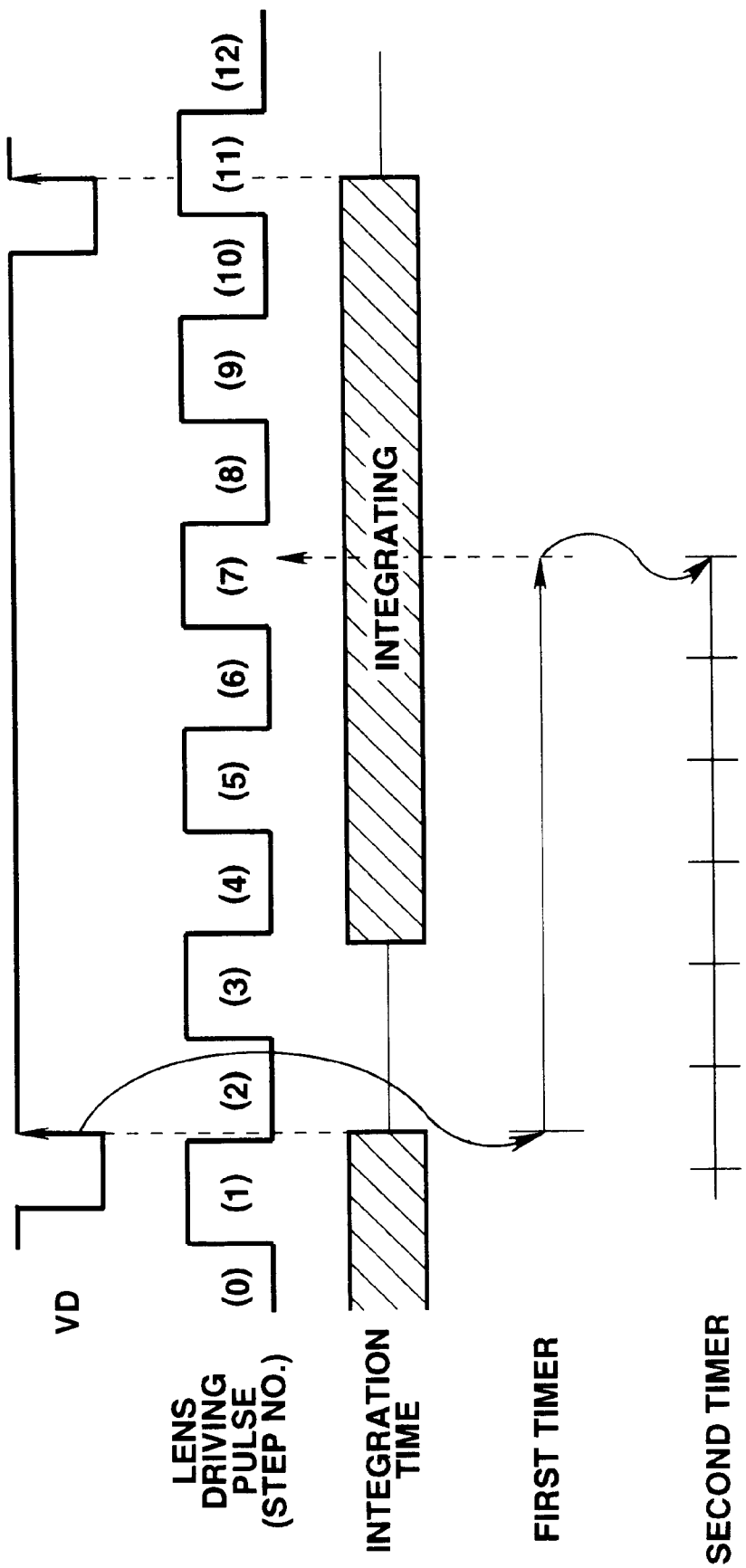
FIG. 4 shows NTSC video signals in which the step position at the midpoint of an integration time is used for focusing when the integration time is varied.

FIG. 4 illustrates the embodiment where the midpoint of the integration time is determined with the integration time varied.

FIG. 4 shows, from the top, the vertical synchronization signal VD, a lens driving pulse (step number), integration times for fields n, n+1, and n+2, and the midpoint of each integration time, the operation of a first timer for measuring the timing of the midpoint of the integration time, and the operation of a second timer for measuring more accurately the timing of the midpoint of the integration time than the first timer. In FIG. 4, the operations of the vertical synchronization signal VD, the lens driving pulse (step numbers), integration times for fields n, n+1, and n+2, and the midpoint of each integration time remain unchanged from those in FIG. 3.

For convenience of explanation, it is assumed that when the device shutter is varied, the end point of the integration time by the device shutter always agrees with the end point of each sampling period (1 VD period).

When the device shutter is used, its integration is known and the midpoint of the integration time is determined from the following equation (1).

Time to midpoint of integration time=1 sampling period−device shutter time/2      (1)

(device shutter time=integration time)
where 1 sample period in NTSC is 1/60 s.

In the control of this embodiment, the first timer in the processing circuit 10 is activated at the rising edge of the vertical synchronization signal VD, and the number of steps of the lens corresponding to the time to the midpoint of the integration time determined by equation (1) (seventh step in FIG. 4) is stored. The number of steps stored corresponds to the number of steps of the contrast value derived from the video signal that is now being integrated.

Even when the device shutter time is varied through AE during focus sensing, AF accuracy is free from degradation, because the time to the midpoint of the integration time is accurately determined from equation (1).

The above description is based on the assumption that the step driving is performed at a uniform speed during the integration time of the image pickup device 3. If the step driving is not performed at a uniform speed, an approximation to equation (1) is empirically determined and that approximation may replace equation (1).

Besides the first timer in the processing circuit 10, the second timer (2) for fine measurement of time may be used to examine a more accurate position of the midpoint within one lens driving pulse (step). The second timer is reset at each transition of the lens driving pulse, and is ready to start counting immediately. In FIG. 4, the midpoint may be recognized as 7 steps or may be recognized as 6.9 steps, for example, in consideration of the count provided by the second timer that is capable of time measurement in a fraction shorter than one pulse, and the lens position is handled as real to be used for focusing process.

When AF operation is performed at the timing shown in FIG. 4, the imaging lens driving is synchronized with the vertical synchronization signal VD or the like at the start of AF operation only. From the first sampling at the start of AF operation, the contrast value (integrated value) at that moment and the number of steps are recognized, and thus AF accuracy is further improved.

In the AF operation, a part of the imaging area is frequently employed as an AF area. In the focusing method according to this embodiment in which the number of steps at the midpoint of the steps driven during the integration time of the image pickup device 3 is employed, the number of steps at the midpoint along the vertical side of the AF area 12 in an imaging area 11 may be used as shown in FIG. 5A.

In the description that follows, a main scan is performed in a horizontal direction and a sub scan is performed in a vertical direction to read the imaging area 11. This means that the scanning is performed as follows: The image pickup device 3 has vertical transfer sections in the vertical direction corresponding to the number of horizontal pixels, pixels of one horizontal line are read through a horizontal transfer section, and then pixels of a next horizontal line separated from the first horizontal line by two vertical pixels (in a monochrome field scanning, but in the case of a monochrome frame scanning, separated from the first horizontal line by one vertical pixel). If the scanning directions are different from the above setting, the vertical direction has to be read as the horizontal direction. When imaging is performed through the color filter, one pixel contains a plurality of pixels working as one color pixel.

Figure 5A:
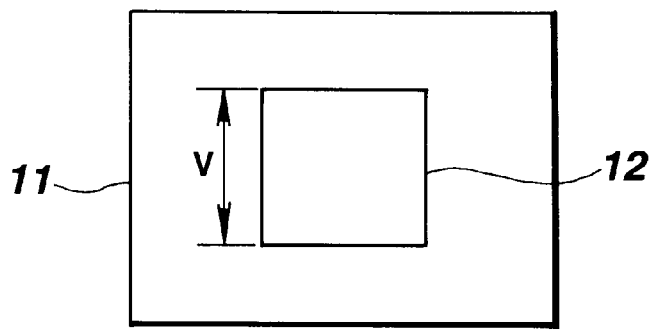
FIG. 5A shows specific examples of AF areas set in an imaging area for focus sensing.
Figure 5B:
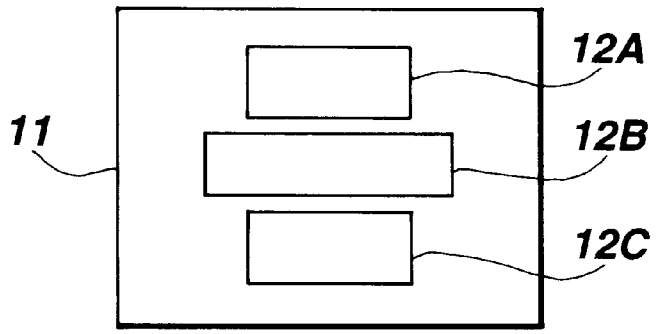
FIG. 5B shows specific examples of AF areas set in an imaging area for focus sensing.

A plurality of areas may be set in the vertical direction rather than a single AF area 12 as shown in FIG. 5A. As shown in FIG. 5B, for example, three AF areas 12A, 12B and 12C may be set vertically with a slight spacing allowed therebetween. The AF operation is performed by switching the AF areas 12A, 12B and 12C depending on the conditions of the object (for example, the area of a maximum contrast value may be selected or any area is selected at the option of a user). An AF system capable of adapting to its imaging environment is thus constructed.

When the plurality of AF areas 12A, 12B and 12C are vertically arranged, lens positions corresponding to the contrast values of the AF areas 12A, 12B and 12C are different (because the vertically central positions of the AF areas 12A, 12B and 12C are different from each other).

Figure 5C:
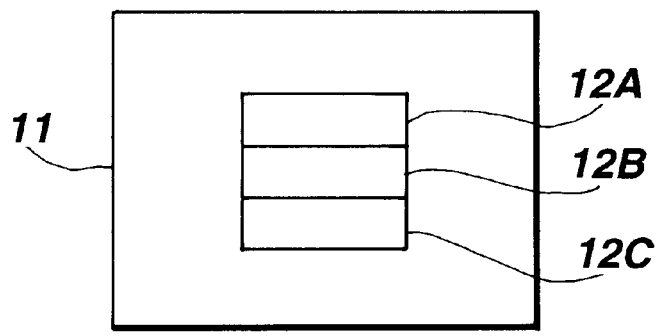
FIG. 5C shows specific examples of AF areas set in an imaging area for focus sensing.

If the AF areas 12A, 12B and 12C in FIG. 5C are vertically arranged with no spacing therebetween, the contrast values of the respective AF areas and the number of steps (more correctly, the lens positions corresponding to the number of steps) corresponding to the contrast values become different.

Figure 6:
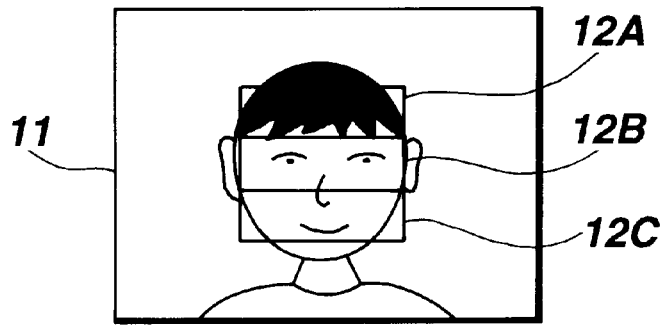
FIG. 6 is an explanatory view showing the operation in focus sensing in connection with the AF areas in FIG. 5C.
Figure 7A:
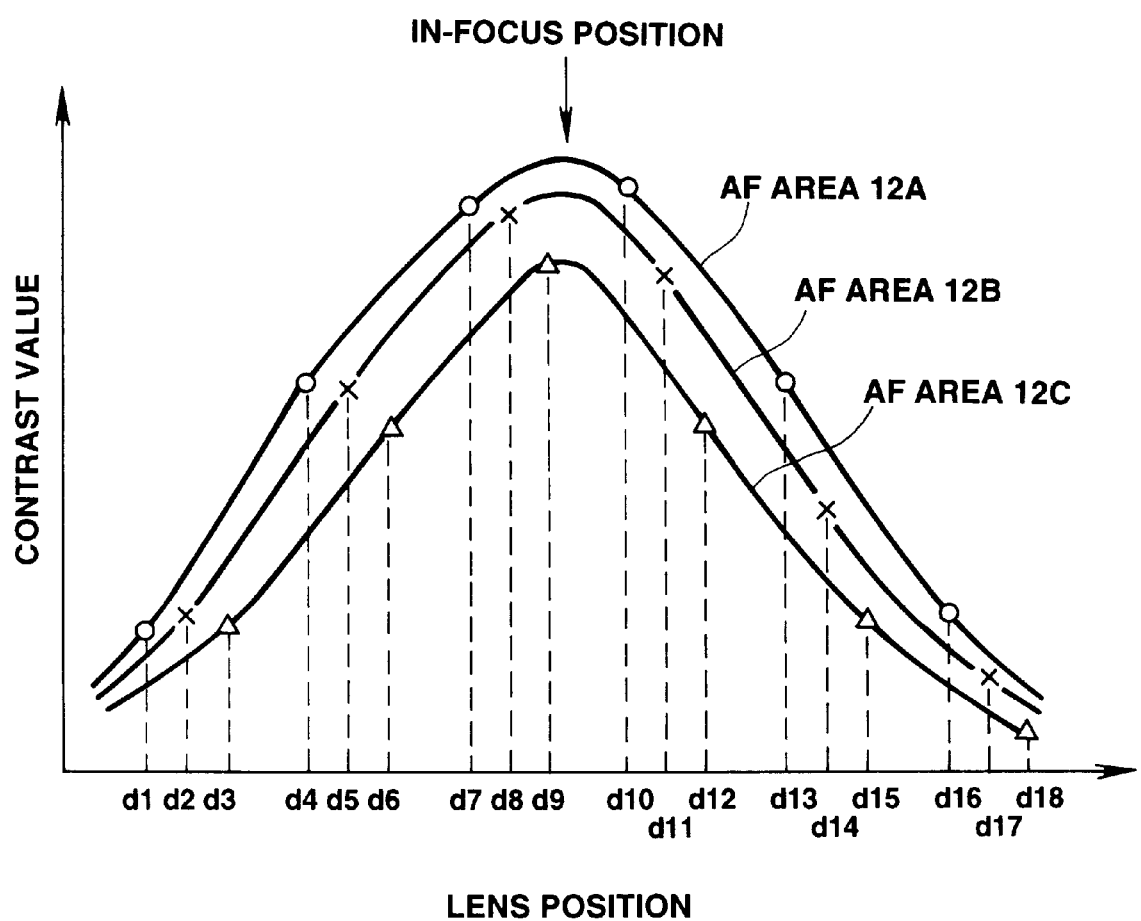
FIG. 7A shows the relationship between lens positions and contrast values in connection with the AF areas in FIG. 5C according to this embodiment of the present invention.
Figure 7B:
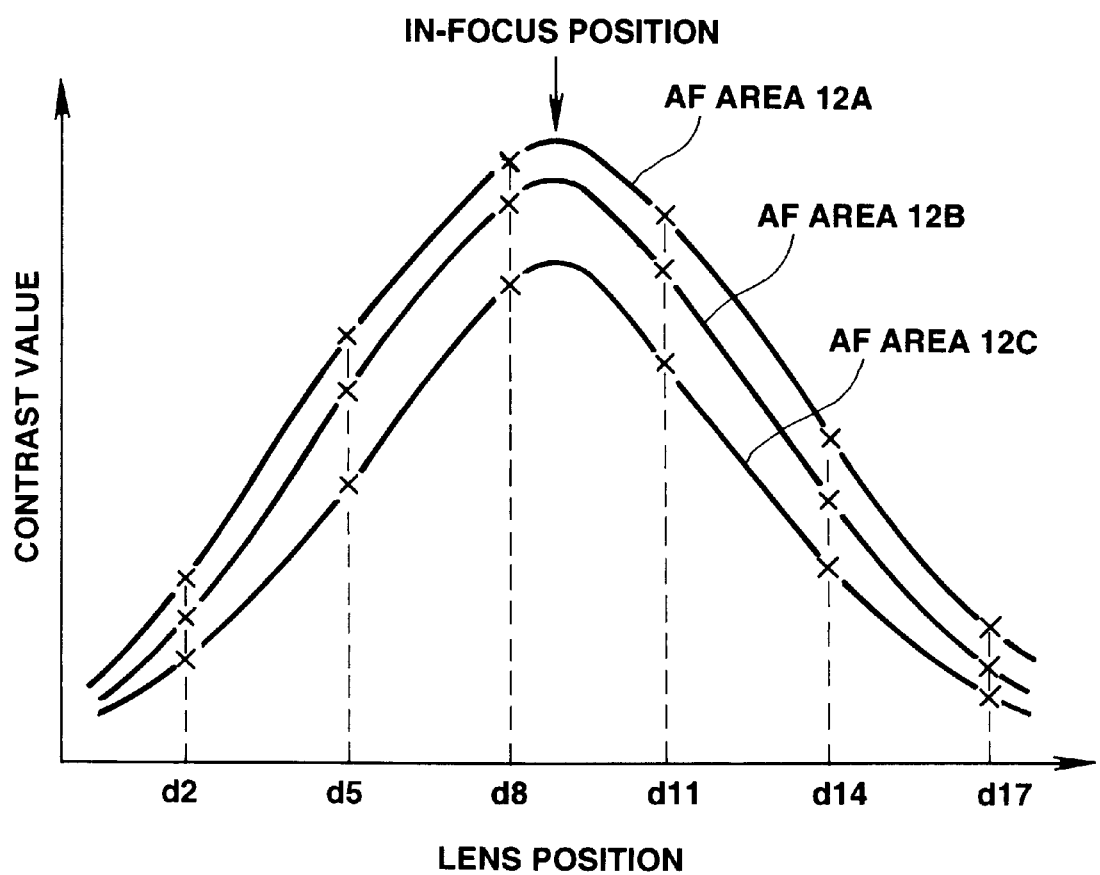
FIG. 7B shows the relationship between lens positions and contrast values in connection with the AF areas in FIG. 5C according to the related art.

When the object in FIG. 6 is imaged, the contrast values of the AF areas 12A, 12B, and 12C are handled as the same lens position in the known art as shown in the graph in FIG. 7B with the ordinate representing contrast value and the abscissa representing lens position. The in-focus position (the maximum contrast position at each AF area) is recognized as approximately d8, which may be shifted from the true in-focus position.

If by contrast, according to this embodiment, the lens positions corresponding to the contrast values in the AF areas 12A, 12B and 12C in the imaging area 11 are regarded as the lens positions corresponding to the step numbers of the approximately vertically central positions of the AF areas 12A, 12B and 12C, the graph in FIG. 7A results. In FIG. 7A, the curves connecting respective points ○, x, ∆ correspond to the contrast values of the AF areas 12A, 12B and 12C, respectively.

As a first specific example, control is performed by regarding the average position $\{(d8+d9+d10)/3\}$ of the in-focus positions d8, d9, and d10 of the AF areas (maximum contrast points) as a true in-focus position. Therefore, AF operation is more accurately performed than in the prior art.

As a second specific example, out of the AF areas, one area is considered which presents a minimum difference between the contrast values at both side lens positions with respect to the maximum contrast lens position at center, and control is performed to the maximum contrast lens position (d9 in AF area 12C in FIG. 7A). Furthermore, the maximum contrast lens position is designed to carry a larger weight than other maximum contrast lens positions and then all the maximum contrast positions are averaged in the same way the first specific example is computed. For example, a predicted in-focus position=$\{(d8+d9\times2+d10)/4\}$.

As another example, out of the AF areas 12A, 12B, and 12C, one area which gives a larger maximum contrast value than other areas is selected, and the imaging lens 2 is controlled to the lens position giving that maximum contrast value.

The above focusing methods have been discussed on condition that the focus sensing device is free from luminance variation (hereinafter referred to as light source flicker) in the light source or the like. If there exists a light source flicker in FIG. 8B, the imaging lens may be set to a false in-focus position that is different from the in-focus position.

If there exists a light source flicker, its corresponding luminance variation component must be removed. When a contrast value is picked up, its luminance value (the output from the image pickup device, the light receiving device output for photometering, or the white balance output may be used) is also picked up to remove the light source flicker.

Figure 8A:
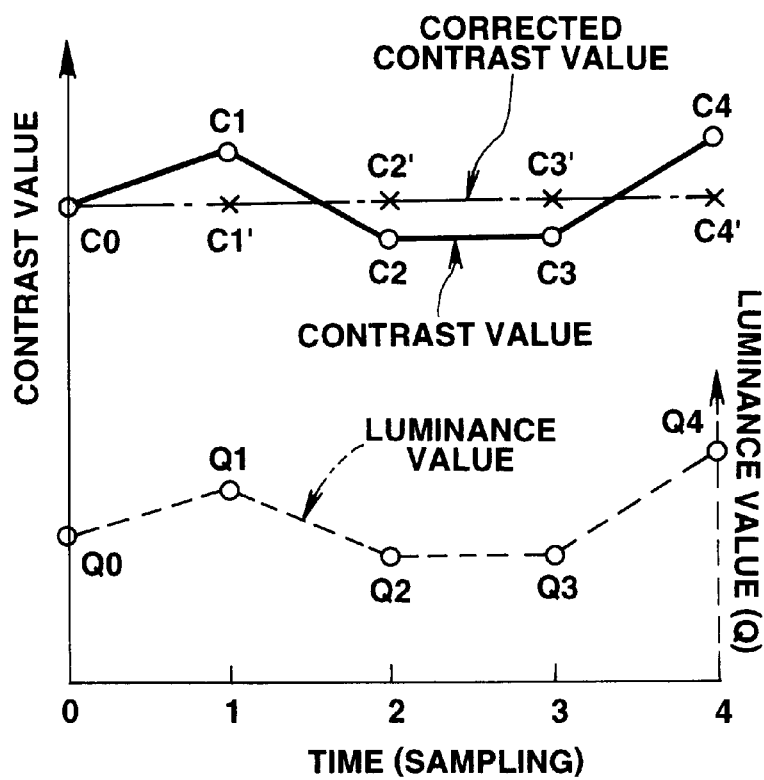
FIG. 8A is an explanatory view showing how to obtain corrected contrast values for alleviating the effect of the flickering of a light source.
Figure 8B:
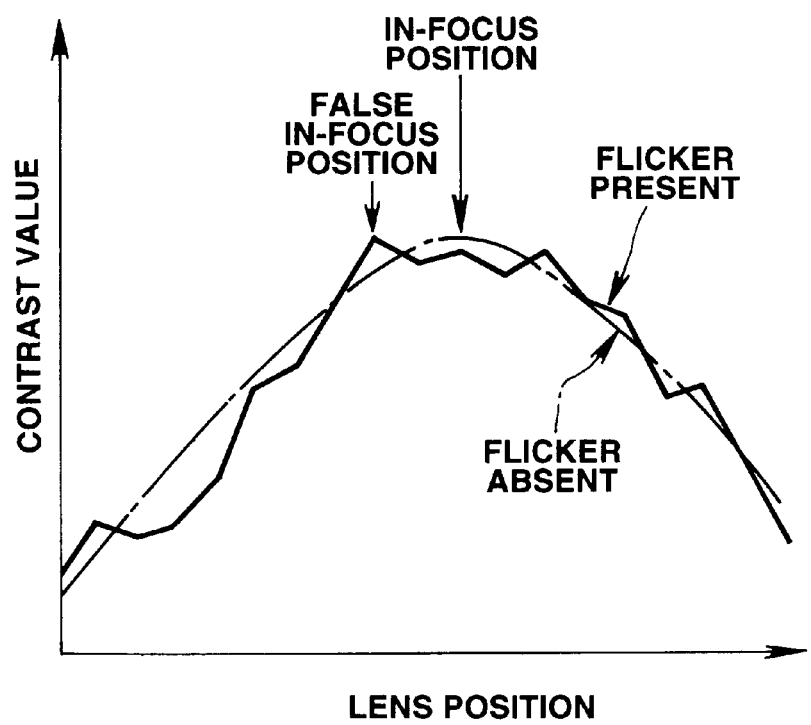
FIG. 8B shows the relationship between lens positions and contrast values to compare flicker-affected and flicker-free results.

Specifically, a luminance value Q0 at the start of AF operation is stored as a reference value (a contrast value is C0 at the same moment) as shown in FIG. 8. At a next sampling, a luminance value of Q1 is obtained, resulting in a rate of change (Q0/Q1). A contrast value C1 at the same moment is multiplied by the rate of change (Q0/Q1) for correction, and a corrected contrast value C1' results.

The corrected contrast value C1' $\{=C1\times(Q0/Q1)\}$ is then used for AF processing (this correction computation is performed by the processing circuit 10). Similarly, a contrast value C2 is multiplied by a rate of change (Q0/Q2) resulting from the reference value Q0 and a luminance value Q2 picked up at a subsequent sampling, and a corrected contrast value C2' $\{=C2\times(Q0/Q2)\}$ is obtained to be used for AF process.

Similarly, a corrected contrast value C3' is obtained by multiplying a contrast value C3 by a rate of change (Q0/Q3) resulting from the reference value Q0 and a luminance value Q3 picked up at a further subsequent sampling, and a corrected contrast value C4' is obtained by multiplying a contrast value C4 by a rate of change (Q0/Q4) resulting from the reference value Q0 and a luminance value Q4 picked up at a yet further subsequent sampling. These corrected contrast values are used for the AF process, removing the effect of light source flickering. The correction computation is easily performed, and thus removal of the effect of light source flickering is easily performed as well. False focusing due to light source flickering is thus alleviated.

When a focal depth is deep with an AF area being vertically narrow (for example, the vertical width V is narrow in FIG. 5A), or when the number of steps of the imaging lens 2 driven within one sampling period is small, it is not necessary to make the number of steps for focus processing strictly agree with the approximate midpoint of the steps driven during the integration of the image pickup device 3. In this case, any of the steps driven during the integration of the image pickup device 3 may be arbitrarily selected as the number of steps for focus processing.

In the focusing method in which the number of steps at the midpoint of the steps for driving the imaging lens 2 during the integration time of the image pickup device 3 is employed, a fast lens driving may create a deviation between a true in-focus position (this is the imaging lens position that exhibits the maximum contrast value which is determined in the course of driving the imaging lens 2 in infinitely fine steps to acquire contrasts, rather than the imaging lens position that exhibits the maximum contrast value during focusing operation) and an actually obtained in-focus position. If the deviation is too large to be covered by the depth of focus, a false focus results.

Figure 9:
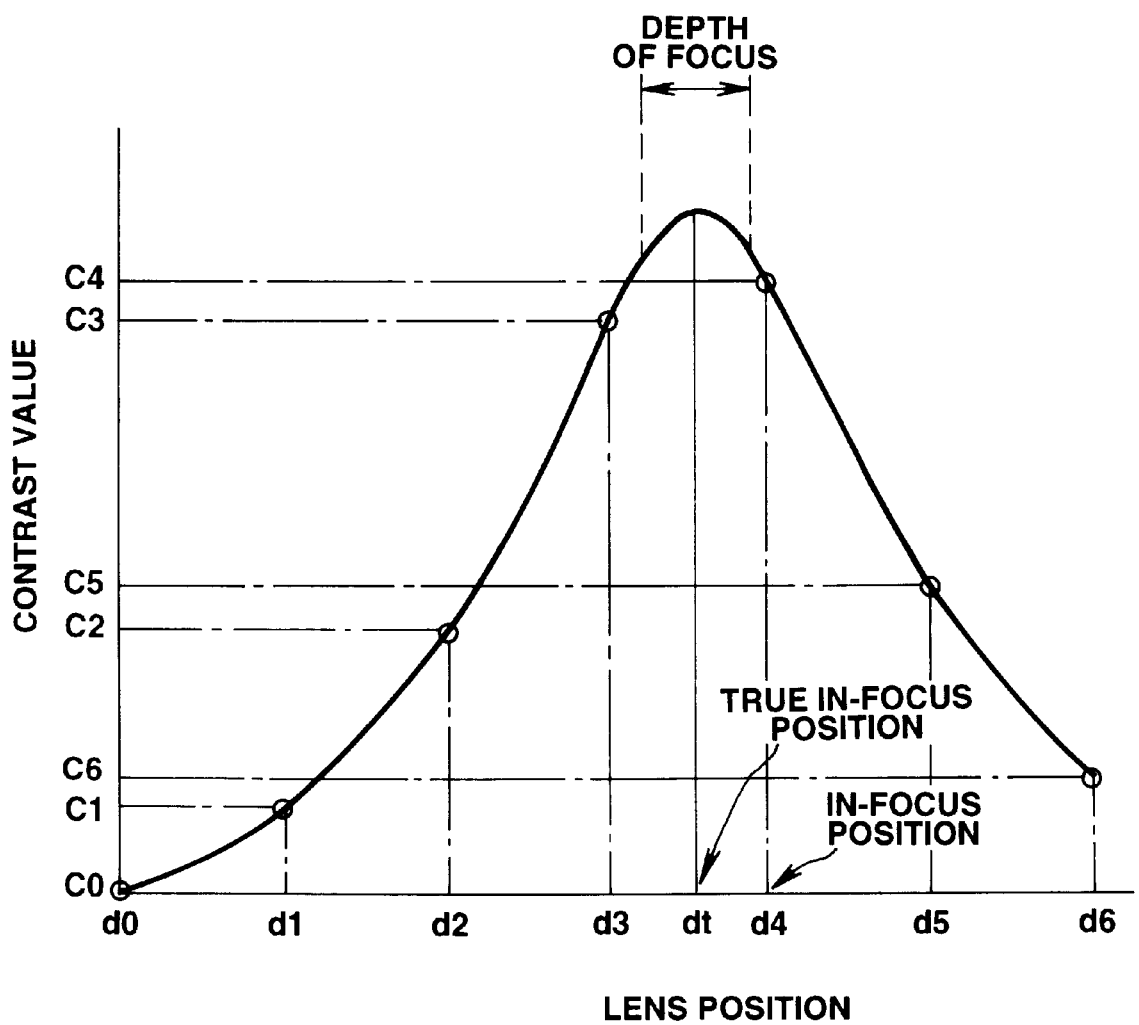
FIG. 9 is an explanatory view showing the possibility that a false focusing may take place at a fast image driving.

Such a situation is discussed referring to FIG. 9. The abscissa represents lens position of the imaging lens and the ordinate represents contrast value corresponding to each lens. Now, the true in-focus position is at lens position dt, and sampling is performed from d0 through d6, resulting in contrast values C0 through C6, respectively.

In AF processing, the imaging lens 2 is sequentially driven in the direction from d0 to d6, and contrast values corresponding to the respective lens positions are acquired. When the imaging lens 2 reaches lens position d5, the device recognizes that a maximum contrast value is obtained at lens position d4, ending AF operation. The actual (true) in-focus position is dt, however. From lens position d4, the focal depth is unable to cover dt. As a result, the AF operation ends with false focusing. A solution to this problem is now discussed.

Figure 10:
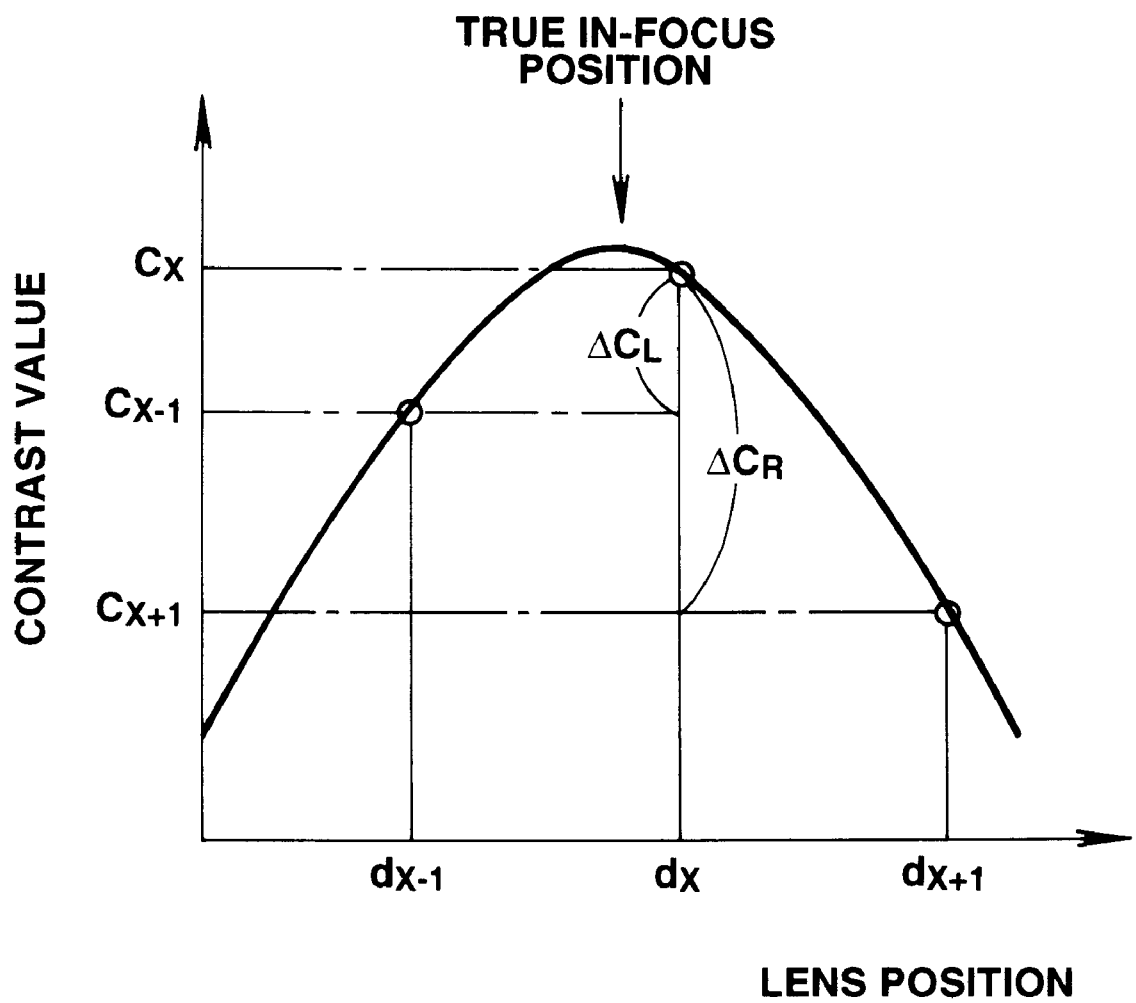
FIG. 10 is an explanatory view showing how to prevent the false focusing in FIG. 9 and perform a high accuracy focus sensing.

In a graph in FIG. 10 (with 10 driving steps in one sampling period), three contrast values obtained at each sampling, one maximum contrast value at center and two contrast values at two side points of the maximum contrast value, and the lens positions corresponding to them are used. The contrast value difference between two side points is determined.

$\Delta CL = C_x - C_{x-1}$ $\Delta CR = C_x - C_{x+1}$

In this case, if viewed from the maximum contrast value, the in-focus position exists to the side of one of the two side points having a larger contrast value. In FIG. 10, the true in-focus position exists between $d_{x-1}$ and $d_x$ (the true in-focus position exists between (dx+dx−1)/2 and dx if the imaging lens driving speed is uniform).

Using the ratio of ΔCL and ΔCR, the imaging lens is controlled toward the true in-focus position. Specifically, corrections values of lens positions are determined according to Table 1 (listed based on 10 step driving in one sampling period).

TABLE 1

| Range of S | Correction values (steps) |
|---|---|
| 1.0 < S ≤ 1.3 | 0 |
| 1.3 < S ≤ 1.8 | 1 |
| 1.8 < S ≤ 2.3 | 2 |
| 2.3 < S ≤ 3.0 | 3 |
| 3.0 < S ≤ 4.2 | 4 |
| 4.2 < S | 5 |

In this case, when ΔCL≦ΔCR, S=ΔCR/ΔCL, and when ΔCL>ΔCR, S=ΔCL/ΔCR. If either ΔCL or ΔCr is 0, correction value is 0. The lens is driven from the lens position having the maximum contrast value toward the true in-focus position by any of the correction values listed in Table 1.

When S is 2.2 in FIG. 10, for example, the corresponding correction value is 2 from Table 1. The lens is driven by 2 steps toward lens position dx−1 from the focus position (dx in this case). In this way, even if the imaging lens 2 is fast driven over a long travel in one sampling period, the proximity point to the true in-focus position is easily predicted, and an improved focusing accuracy results.

The above method involves no complex computation. The table listing "Range of S" and corresponding "correction values" may be stored in an EEPROM, and its modification may be easily performed. The table is easily empirically determined. If a plurality of tables are furnished to comply with imaging environments (luminance of the object, diaphragm stop, focal length), focusing accuracy is definitely further improved.

This method is implemented in the known autofocusing methods (including the one in which an imaging lens is driven in synchronization with a synchronization signal for producing a video signal).

This method requires three positions of sampling. At least three positions within the range of driving of the imaging lens 2 are sampled for focus processing. To sample three positions over all driving steps (namely, within the range of travel of the imaging lens 2), the maximum driving amount of the imaging lens 2 per one sampling period is preferably half the driving steps or less. In excess of this limit, the third sampling position is set to be beyond the range of travel of the imaging lens 2.

The focusing system malfunctions if the number of steps (driving speed) that can be driven during one sampling period is not observed. This limit has to be observed.

The above described focusing method is implemented in the known autofocusing methods (including the one in which an imaging lens is driven in synchronization with a synchronization signal for producing a video signal).

According to the embodiment of the present invention, a high focusing accuracy is maintained even if the imaging lens 2 is fast driven in the integration time of the image pickup device 3 (without the need for ensuring synchronization with the synchronization signal for producing the video signal).

In this invention, it is apparent that working modes different in a wide range can be formed on the basis of this invention without departing from the spirit and scope of the invention. This invention is not restricted by any specific embodiment except may be limited by the appended claims.

What is claimed is:

1. An automatic focus sensing device which senses an in-focus position by using a high-frequency component in an image signal to step drive an imaging lens in a direction of an optical axis of the imaging lens, said image signal being read in succession to a photoelectrical conversion and then integration of light of an object incident on an image pickup device, said automatic focus sensing device generating, in non-synchronization with and independently of an image synchronization signal, a driving pulse fed to an imaging lens driving device for driving the imaging lens, wherein a number of steps for step driving the imaging lens take place during an interval lying within an interval for integration, said number of steps for step driving the imaging lens establishing an imaging lens position corresponding to a high frequency, component in an image signal, said image signal being read successively during integration within said integration interval.

2. An automatic focus sensing device according to claim 1, wherein at a start of automatic focus sensing, the image synchronization signal is synchronized with the driving pulse fed to the imaging lens driving device.

3. An automatic focus sensing device according to claim 1, wherein the number of steps for step driving takes place in a duration that terminates substantially at a midpoint of the integration interval.

4. An automatic focus sensing device according to claim 1, wherein the integration interval is formed based on an image signal that is read with light of an object incident on the image pickup device being photoelectrically converted and then integrated during an integration time, said integration time being variable.

5. An automatic focus sensing device according to claim 1, wherein said automatic focus sensing device picks up the high-frequency component for automatic focus sensing contained in a part of a photoelectrical conversion area of the image pickup device, whereby a duration needed to read the part of the photoelectrical conversion area corresponds to a number of steps for step driving the imaging lens taking place in the duration within the integration interval.

6. An automatic focus sensing device according to claim 5, wherein when the photoelectrical conversion area of the image pickup device is divided into a plurality of areas that are separated from or border on each other, a number of steps for each area correspond to a duration that includes an approximate midpoint of each area.

7. An automatic focus sensing device according to claim 6, wherein the plurality of areas are arranged in a vertical direction of the photoelectrical conversion area of the image pickup device.

8. An automatic focus sensing device according to claim 5 or 6, wherein said automatic focus sensing device senses the in-focus position by using the high-frequency component in the image signal to step drive the imaging lens in the direction of the optical axis of the imaging lens, said image signal being read in succession to the photoelectrical conversion and then integration of the light of the object incident on the image pickup device, and then regards a peak of the high-frequency component as the in-focus position of the imaging lens, whereby peaks of the parts of the photoelectrical conversion area are independently sensed.

9. An automatic focus sensing device according to claim 5 or 6, wherein said automatic focus sensing device senses the in-focus position by using the high-frequency component in an image signal to step drive the imaging lens in the direction of the optical axis of the imaging lens, said image signal being read in succession to the photoelectrical conversion and then integration of the light of the object incident on the image pickup device, and then regards a peak of the high-frequency component as the in-focus position of the imaging lens, whereby peaks of parts of the photoelectrical conversion area are independently sensed and then compared to set the in-focus position of the imaging lens.

10. An automatic focus sensing device according to claim 1, 2, 5, 6 or 7, wherein a variation component of luminance in an image signal is removed before picking up the high-frequency component of the image signal.

11. An automatic focus sensing device according to claim 10, wherein one of an output of a light receiving device for photometering and an output of a light receiving device for auto white balance is used as means for removing a variation component in luminance in the image signal.

12. An automatic focus sensing device according to claim 1 or 2, wherein said automatic focus sensing device senses the in-focus position by using the high-frequency component in an image signal to step drive the imaging lens in the direction of the optical axis of the imaging lens, said image signal being read in succession to the photoelectrical conversion and then integration of the light of the object incident on the image pickup device, whereby an interpolation is used to determine the in-focus position by comparing three points of the high-frequency component obtained at each step driving when the high-frequency component at a center point of the three points is maximum and high-frequency components at both side points are smaller, and focus setting is biased to one side point of said both side points having a larger high-frequency component value.

13. An automatic focus sensing device according to claim 1 or 2, wherein said automatic focus sensing device senses the in-focus position by using the high-frequency component in an image signal to step drive the imaging lens in the direction of the optical axis of the imaging lens, said image signal being read in succession to the photoelectrical conversion and then integration of the light of the object incident on the image pickup device, whereby to determine the in-focus position, said automatic focus sensing device samples at least at three points of the high-frequency component in the image signal within a driving range of the imaging lens.

14. An automatic focus sensing device according to claim 1 or 2, wherein a range of driving in one sampling period is half of all driving steps or less.

15. An automatic focus sensing device according to claim 1 or 2, wherein step driving is performed at a uniform speed in an integration interval.

16. An automatic focus sensing device according to claim 9, wherein the in-focus position is set according to an arithmetic mean of step positions corresponding to maximum values of high-frequency components extracted from a part of the photoelectric conversion area.

17. An automatic focus sensing device according to claim 9, wherein the in-focus position is set according to a weighted mean of step positions corresponding to maximum values of the high-frequency components extracted from a part of the photoelectric conversion area.

18. An automatic focus sensing device according to claim 9, wherein the in-focus position is set according to the high-frequency component selected form the high-frequency components extracted from a part of the photoelectric conversion area.

\* \* \* \* \*